United States Patent
Wang et al.

(10) Patent No.: US 7,810,768 B2
(45) Date of Patent: Oct. 12, 2010

(54) SUPPORT STAND AND DISPLAY DEVICE USING THE SAME

(75) Inventors: Jin-Xin Wang, Shenzhen (CN); Chao-Zhong Fu, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/412,621

(22) Filed: Mar. 27, 2009

(65) Prior Publication Data

US 2010/0072333 A1    Mar. 25, 2010

(30) Foreign Application Priority Data

Sep. 19, 2008    (CN)    ......................... 2008 1 0304582

(51) Int. Cl.
*F16M 11/04*    (2006.01)

(52) U.S. Cl. .................................................. 248/176.3

(58) Field of Classification Search ................. 248/920, 248/922, 454, 455; 40/745, 607.04; 292/275, 292/271, 262, 1.5

See application file for complete search history.

(56) References Cited

U.S. PATENT DOCUMENTS

| | | | | |
|---|---|---|---|---|
| 3,029,548 A | * | 4/1962 | Nessim | 248/455 |
| 4,295,624 A | * | 10/1981 | Granada | 248/456 |
| 2008/0117574 A1 | * | 5/2008 | Lee | 361/681 |

* cited by examiner

*Primary Examiner*—J. Allen Shriver, II
*Assistant Examiner*—Erin Smith
(74) *Attorney, Agent, or Firm*—Clifford O. Chi

(57) ABSTRACT

A display device includes a display monitor, a supporting portion formed on a bottom surface of the display monitor, and a support stand fixed on the display monitor. The supporting portion and the support stand cooperatively support the display monitor. The support stand includes a connecting member fixed on the display monitor and a sliding member sleeved on the connecting member. The sliding member slides along the connecting member to change the length of the support stand, thus adjusting the viewing angle of the display monitor.

16 Claims, 3 Drawing Sheets

SUPPORT STAND AND DISPLAY DEVICE USING THE SAME

CROSS REFERENCE STATEMENT

This application is related to a co-pending U.S. patent application, which is application Ser. No. 12/344,669, and entitled "SUPPORT STAND AND FLAT-PANEL DISPLAY MONITOR USING SAME". In the co-pending application, the inventors are Jin-Xin Wang, Chao-Zhong Fu and Jian Li. The co-pending application has the same assignee as the present application.

BACKGROUND

1. Technical Field

The present disclosure relates to support stands and display devices using the same and, more particularly, to a support stand having an adjustable viewing angle and a display device using the support stand.

2. Description of Related Art

A typical support stand for display devices, such as liquid crystal display devices, generally includes a mounting bracket, a fixing base, and a connecting bracket positioned between the mounting bracket and the fixing base. The mounting bracket is used for mounting a display monitor. The mounting bracket is pivotally connected to the connecting bracket by a hinge assembly. The hinge assembly includes a plurality of frictional pieces to generate frictional forces. The mounting bracket is rotated relative to the connecting bracket, thereby adjusting the viewing angle of the display monitor. When the display monitor has reached a desired angle, the display monitor can remain at its present position by frictional forces generated between the frictional pieces.

However, in the typical support stand, the weight of the display monitor is placed entirely on the connecting bracket. If the support stand supports a heavy display monitor, such as a large sized display monitor or an integrative display monitor combined with a mainframe, the connecting bracket must be made more durable to support the larger weight. Thus, a manufacturing cost of the support stand will be increased. In addition, the frictional pieces may become loose from abrasion. As a result, the display monitor may not remain stably positioned at the selected viewing angle.

Therefore, a support stand and a display device using the support stand to solve the aforementioned problems are desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
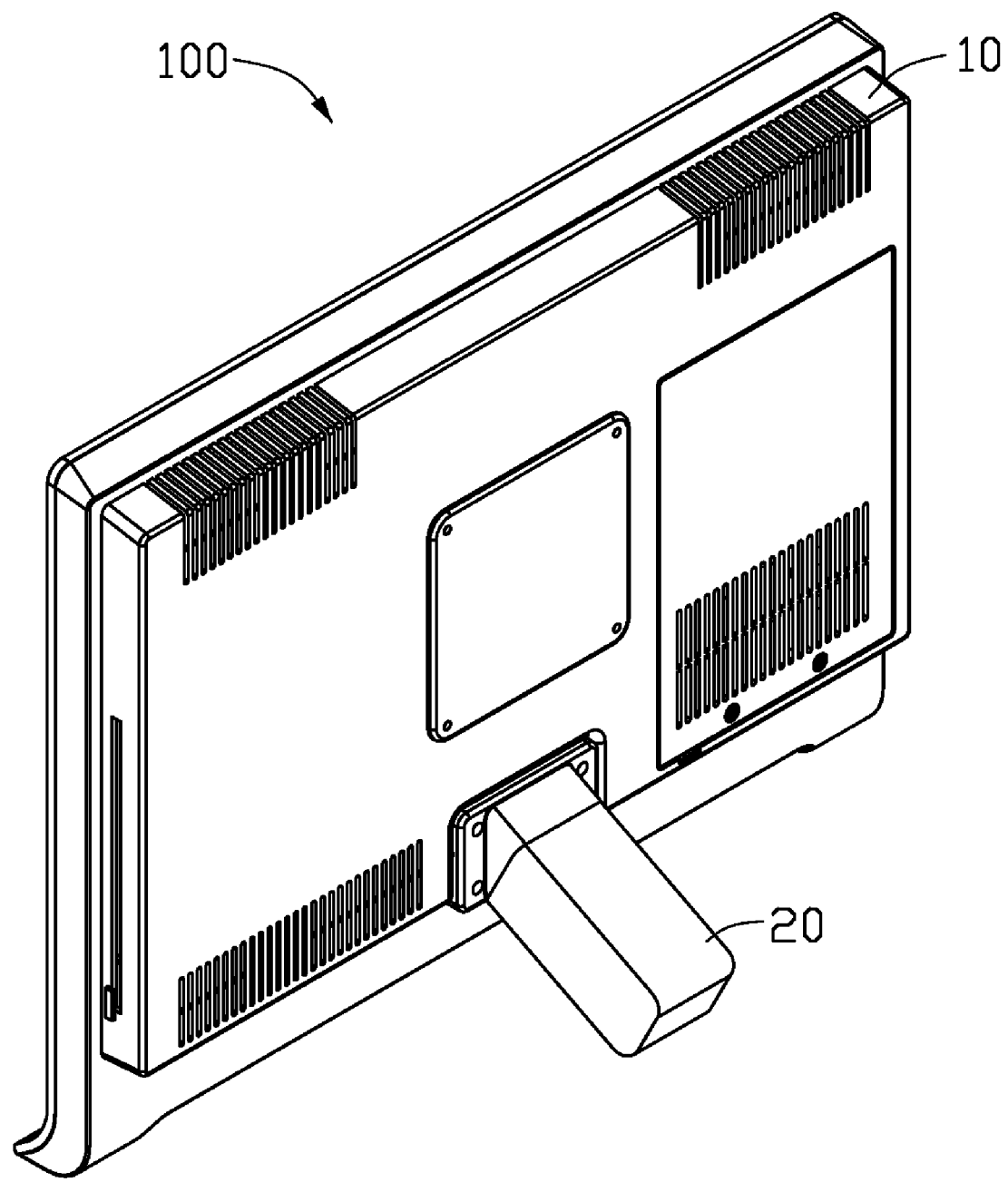
FIG. 1 is an assembled, isometric view of one embodiment of a display device including one embodiment of a support stand.

Referring to FIG. 1, an embodiment of a display device 100 includes a display monitor 10 and an embodiment of a support stand 20 connected to the display monitor 10. The display monitor 10 and the support stand 20 cooperatively form a substantially inverted y-shaped standing structure that can be supported on a flat surface (not shown).

Figure 2:
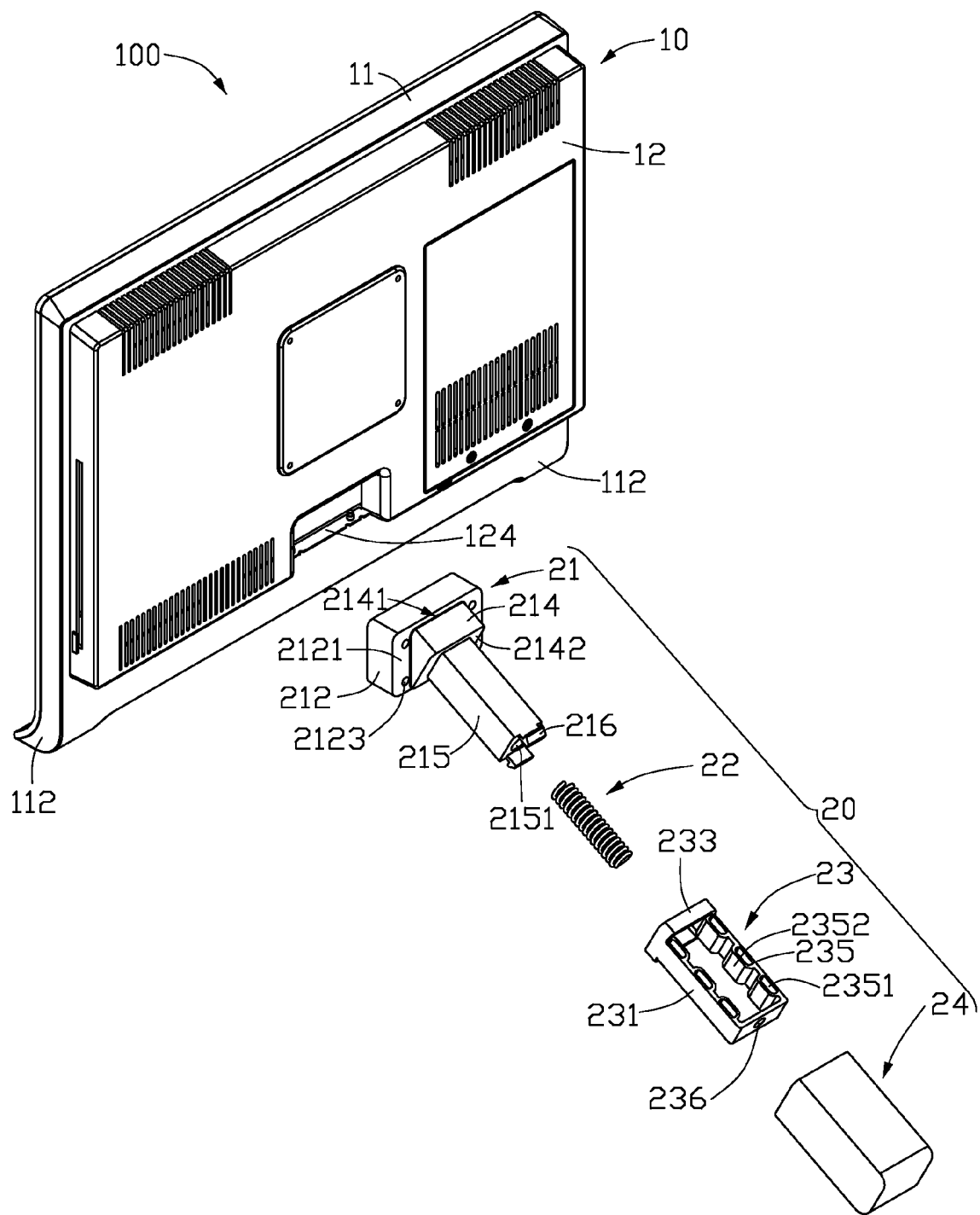
FIG. 2 is an exploded, isometric view of the display device in FIG. 1.

Referring to FIG. 2, the display monitor 10 includes a first frame 11 and a second frame 12 behind the first frame 11. The first frame 11 forms two supporting portions 112 on a bottom surface of the first frame 11. Each supporting portion 112 is bent away from the second frame 12. The supporting portions 112 may abut against the flat surface to support the display monitor 10. In an alternative embodiment, a rubber pad may be configured on a bottom surface of the supporting portion 112 to increase a frictional force generated between the flat surface and the supporting portion 112. The second frame 12 defines a mounting groove 124 to mount the support stand 20. The mounting groove 124 may be a substantially rectangular groove.

Figure 3:
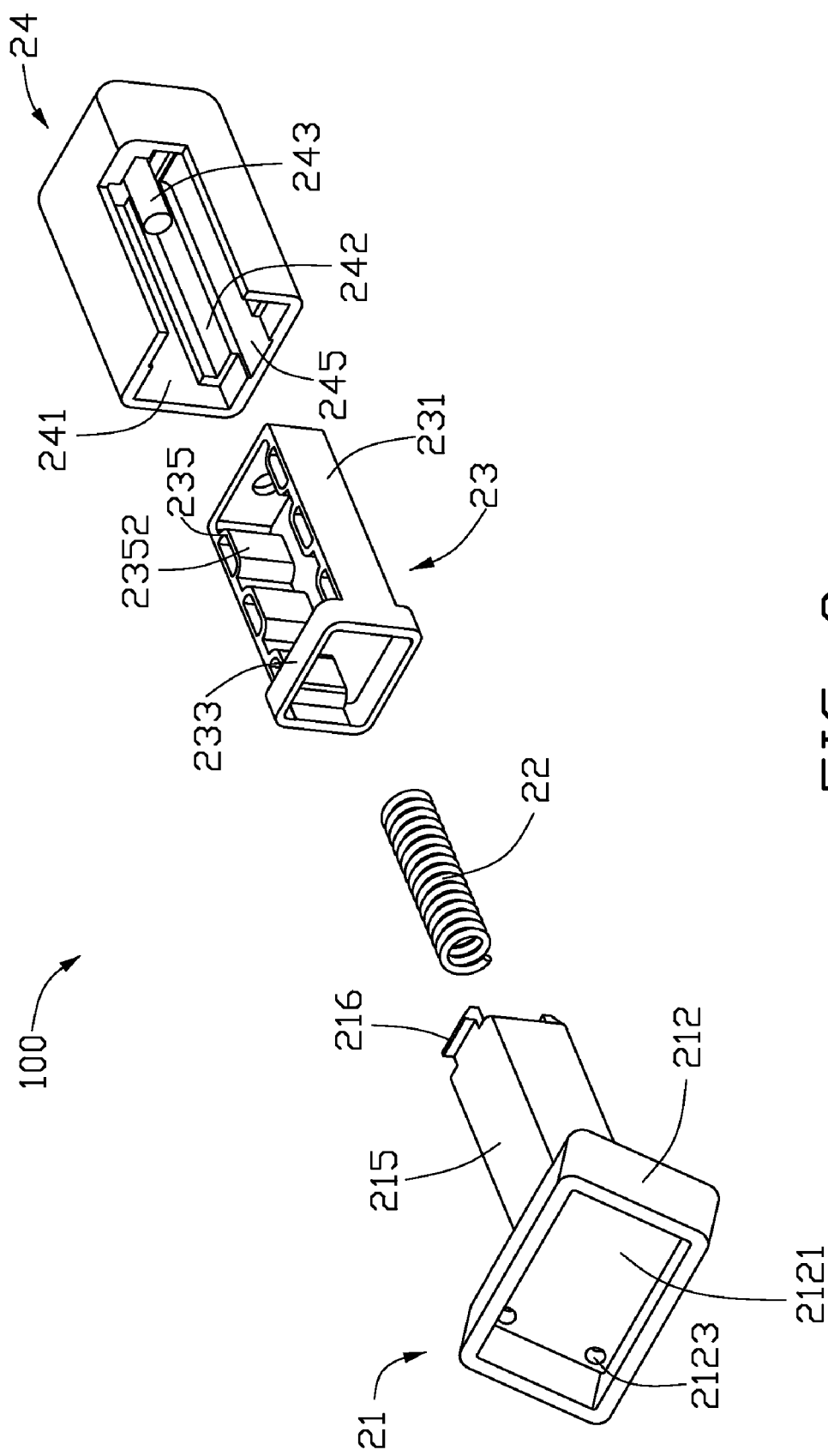
FIG. 3 is an exploded, isometric view of the support stand in FIG. 1.

Referring also to FIG. 3, the support stand 20 includes a connecting member 21, an elastic member 22, a sliding member 23, and a housing 24.

The connecting member 21 includes a mounting portion 212, a guide portion 215, and a connecting portion 214 connecting the mounting portion 212 to the guide portion 215. The mounting portion 212 may be a substantially hollow rectangular block corresponding to the shape of the mounting groove 124. The mounting portion 212 defines a plurality of mounting holes 2123 on a bottom surface 2121 to mount the support stand 20 on the display monitor 10. In an alternative embodiment, the mounting portion 212 may be a mounting plate fixed on the display monitor 10, thus eliminating the need for the mounting groove 124.

The connecting portion 214 includes a first surface 2141 adjoining the mounting portion 212 and a second surface 2142 adjoining the guide portion 215. The first and second surfaces 2141, 2142 cooperatively define an acute angle.

The guide portion 215 may be a substantially elongated rectangular block extending substantially perpendicularly from the second surface 2142 of the connecting portion 214. The guide portion 215 defines a receiving hole 2151 in a distal end to fix the elastic member 22. The guide portion 215 forms two restricting portions 216 on opposite sides of the receiving hole 2151. In the illustrated embodiment, the restricting portions 216 are hooks.

The elastic member 22 may be a helical spring positioned between the connecting member 21 and the sliding member 23 to provide an elastic force along the guide portion 215, thereby supporting the display monitor 10. Alternatively, the elastic member 22 may be elastic rubber rings, or cylinders.

The sliding member 23 includes a sliding portion 231 and a latching portion 233. The sliding portion 231 forms a plurality of frictional protrusions 235 on opposite inner surfaces. Each frictional protrusion 235 defines a through hole 2351 in a middle portion, so that the frictional protrusion 235 can deform elastically. Each frictional protrusion 235 has a frictional surface 2352 to abut the guide portion 215. The sliding portion 231 further defines a circular hole 236 in a bottom surface. The latching portion 233 is a substantially rectangular frame and sleeved on the guide portion 215.

The housing 24 is a substantially hollow rectangular block to receive the guide portion 215, the elastic member 22 and the sliding member 23. Two protruding bars 242 are formed on opposite inner surfaces of the housing 24, thus defining a latching slot 241 between the two protruding bars 242 and a side wall of the housing 24. A protruding pole 243 is formed on a bottom inner surface of the housing 24 and extends through the circular hole 236 of the sliding member 23. The other opposite inner surfaces of the housing 24 without the sliding bars 242 define two sliding grooves 245 to engage with the restricting portions 216. A size of the opening of the housing 24 is slightly smaller than a size of the latching portion 233, so that the latching portion 233 can be tightly fixed in the opening of the housing 24. In an alternative embodiment, the housing 24 may be integrally formed with the sliding member 23.

The connecting member 21, the sliding member 23 and the housing 24 may be made of plastic materials. Thus, the support stand 20 has a light weight and a low manufacturing cost.

In assembly, the sliding portion 231 of the sliding member 23 is inserted in the latching slot 241 of the housing 24. The protruding pole 243 is inserted through the circular hole 236 of the sliding member 23. The latching portion 233 is tightly fixed in the opening of the housing 24, thus fixing the sliding member 23 in the housing 24. The first end of the elastic member 22 is sleeved on the protruding pole 243, and the second end of the elastic member 22 is fixed in the receiving hole 2151 of the connecting member 21. The guide portion 215 of the connecting member 21 is inserted through the latching portion 233, and tightly contacts the frictional protrusions 235. The restricting portions 216 can abut a side surface of the latching portion 233, thus preventing the sliding member 23 together with the housing 24 from detaching from the connecting member 21. Finally, the mounting portion 212 of the connecting member 21 is fixed in the mounting groove 124 of the display monitor 10.

Since the components of the support stand 20 are assembled together by interlocking mechanically with each other, it is easy to assemble or disassemble the support stand 20 from the display monitor 10. Thus, if a component of the support stand 20 becomes worn out, it can be conveniently replaced.

The viewing angle of the display monitor 10 is adjustable by lengthening or shortening the support stand 20. When the sliding member 23, together with the housing 24, slide along the guide portion 215 away from the mounting portion 212, a length of the support stand 20 is increased, and the display monitor 10 leans forward. When the sliding member 23, together with the housing 24, slide along the guide portion 215 towards the mounting portion 212, the length of the support stand 20 is decreased, and the display monitor 10 leans backward.

The support stand 20 maintains a desired length due to the frictional force generated between the guide portion 215 and the frictional protrusions 235. The support stand 20 and the supporting portions 112 stand on the flat surface to cooperatively support the display monitor 10. Thus, the display monitor 10 is stably remained at the viewing angle selected by a user. Since most of the weight of the display monitor 10 is reacted by the supporting portions 112, the support stand 20 can be used to support a heavy display monitor. The elastic member 22 provides an elastic force along the support stand 20 to balance a part of the weight of the display monitor 10, and against the frictional forces generated between the guide portion 215 and the frictional surfaces 2352 of the frictional portions 235. Therefore, the force applied on the support stand 20 is small, and the support stand 20 is less prone to wear and tear, thus having a long service life. In addition, the support stand 20 is a simple structure and simple to use.

It should be pointed out that the sliding member 23 may directly stand on the flat surface, and the housing 24 may be omitted. The elastic member 22 may also be omitted. The guide portion 215 may tightly contact the inner surfaces of the sliding portions 231 to generate frictional force, thus the frictional protrusions 235 may be omitted. The guide portion 215 may form a slanted surface on an end to fix on the display monitor 10, thus the mounting portion 212, the connecting portion 214 and the mounting groove 124 may all be omitted.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A support stand used for supporting a display monitor, the support stand comprising:
   a connecting member fixed on the display monitor;
   a sliding member sleeved on the connecting member and being slidable along the connecting member to change the length of the support stand, thus adjusting the viewing angle of the display monitor;
   wherein the connecting member comprises a guide portion; the sliding member comprises a sliding portion to slide along the guide portion, the sliding portion forming a plurality of frictional protrusions on opposite inner surfaces, each said frictional protrusion having a frictional surface to contact with the guide portion and defining a through hole therein, so that each said frictional protrusion is elastic.

2. The support stand of claim 1, wherein the connecting member further comprises a mounting portion fixed on the display monitor, and a connecting portion connecting the mounting portion and the guide portion.

3. The support stand of claim 2, wherein the connecting portion comprises a first surface adjoining the mounting portion and a second surface adjoining the guide portion; the first and second surfaces cooperatively define an acute angle; the guide portion extends substantially perpendicularly from the second surface of the connecting portion.

4. The support stand of claim 1, wherein the guide portion forms two restricting portions on an end away from the mounting portion; the sliding member comprises a latching portion engaging with the restricting portions.

5. The support stand of claim 4, wherein the restricting portions are hooks; the latching portion is a substantially rectangular frame and sleeved on the guide portion; the restricting portions abut a side surface of the latching portion, thus preventing the sliding member from detaching from the connecting member.

6. The support stand of claim 1, further comprising an elastic member positioned between the connecting member and the sliding member to provide an elastic force.

7. The support stand of claim 2, further comprising a housing to receive the guide portion and the sliding member.

8. The support stand of claim 7, wherein two protruding bars are formed on opposite inner surfaces of the housing, thus defining a latching slot between the protruding bars and a side wall of the housing; the guide portion and the sliding member are inserted in the latching slot.

9. The support stand of claim 7, wherein the sliding member comprises a latching portion formed on an end; a size of the opening of the housing is slightly smaller than a size of the latching portion, so that the latching portion is fixed in the opening of the housing.

10. The support stand of claim 7, wherein the housing is integrally formed with the sliding member.

11. A display device, comprising:
    a display monitor; and
    a support stand fixed on the display monitor, wherein the display monitor and the support stand cooperatively form a substantially inverted y-shaped standing structure, a length of the support stand is changeable, thus adjusting the viewing angle of the display monitor, the support stand comprising:

a connecting member fixed on the display monitor;

a sliding member sleeved on the connecting member and being slidable along the connecting member to change the length of the support stand;

wherein the connecting member comprises a guide portion; the sliding member comprises a sliding portion to slide along the guide portion, the sliding portion forming a plurality of frictional protrusions on opposite inner surfaces, each said frictional protrusion having a frictional surface to contact with the guide portion and defining a through hole therein, so that each said frictional protrusion is elastic.

12. The display device of claim 11, further comprising an elastic member positioned between the connecting member and the sliding member to provide an elastic force.

13. A display device, comprising:

a display monitor;

a supporting portion formed on a bottom surface of the display monitor; and a support stand fixed on the display monitor;

wherein the supporting portion and the support stand cooperatively support the display monitor, the support stand comprises a connecting member fixed on the display monitor and a sliding member sleeved on the connecting member, the sliding member is slidable along the connecting member to change the length of the support stand, thus adjusting the viewing angle of the display monitor;

wherein the connecting member comprises a guide portion; the sliding member comprises a sliding portion to slide along the guide portion, the sliding portion forming a plurality of frictional protrusions on opposite inner surfaces, each said frictional protrusion having a frictional surface to contact with the guide portion and defining a through hole therein, so that each said frictional protrusion is elastic.

14. The display device of claim 13, wherein a rubber pad is configured on the bottom surface of the supporting portion.

15. The display device of claim 13, further comprising an elastic member positioned between the connecting member and the sliding member to provide an elastic force.

16. A support stand used for supporting a display monitor, the support stand comprising:

a connecting member fixed on the display monitor, the connecting member comprising a mounting portion, a guiding portion, and a connecting portion connecting the mounting portion and the guide portion;

a sliding member sleeved on the connecting member and being slidable along the connecting member to change the length of the support stand, thus adjusting the viewing angle of the display monitor;

wherein the guiding portion forms two hooks on an end away from the mounting portion; the sliding member comprises a latching portion engaging with the hooks, the latching portion being a substantially rectangular frame and sleeved on the guiding portion; the hooks abut a side surface of the latching portion, thus preventing the sliding member from detaching from the connecting member.

* * * * *